United States Patent
Barowski et al.

(10) Patent No.: US 9,337,122 B2
(45) Date of Patent: May 10, 2016

(54) TRANSFERRING HEAT THROUGH AN OPTICAL LAYER OF INTEGRATED CIRCUITRY

(71) Applicant: GLOBALFOUNDRIES INC., Cayman Islands (KY)

(72) Inventors: Harry Barowski, Boeblingen (DE); Thomas Brunschwiler, Thalwil (CH); Roger F. Dangel, Zug (CH); Hubert Harrer, Schoenaich (DE); Andreas Huber, Leonberg (DE); Norbert M. Meier, Zurich (CH); Bruno Michel, Zurich (CH); Tim Niggemeier, Laatzen (DE); Stephan Paredes, Zurich (CH); Jochen Supper, Herrenberg (DE); Jonas R. Weiss, Zurich (CH)

(73) Assignee: GLOBALFOUNDRIES INC., Cayman House (KY)

( * ) Notice: Subject to any disclaimer, the term of this patent is extended or adjusted under 35 U.S.C. 154(b) by 0 days.

(21) Appl. No.: 14/633,069

(22) Filed: Feb. 26, 2015

(65) Prior Publication Data
US 2015/0221575 A1    Aug. 6, 2015

Related U.S. Application Data

(63) Continuation of application No. 14/093,248, filed on Nov. 29, 2013, now Pat. No. 9,058,461, which is a continuation of application No. 13/010,184, filed on Jan. 20, 2011, now Pat. No. 9,064,080.

(51) Int. Cl.
| G02B 6/12 | (2006.01) |
| H01L 23/367 | (2006.01) |
| G02B 6/42 | (2006.01) |
| G02B 6/43 | (2006.01) |
| G02B 6/122 | (2006.01) |
| G06F 17/50 | (2006.01) |

(52) U.S. Cl.
CPC ............... *H01L 23/367* (2013.01); *G02B 6/12* (2013.01); *G02B 6/122* (2013.01); *G02B 6/4269* (2013.01); *G02B 6/4272* (2013.01); *G02B 6/43* (2013.01); *G06F 17/5068* (2013.01); *G06F 17/5077* (2013.01); *G02B 2006/12147* (2013.01); *G06F 17/5022* (2013.01); *H01L 2224/16225* (2013.01); *H01L 2924/15311* (2013.01)

(58) Field of Classification Search
None
See application file for complete search history.

(56) References Cited

U.S. PATENT DOCUMENTS

| 5,881,199 A * | 3/1999 | Li ..................... G02B 6/12016 385/14 |
| 6,393,169 B1 | 5/2002 | Paniccia et al. |
| 6,757,499 B1 | 6/2004 | Aoki |
| 7,023,023 B2 | 4/2006 | Karnik et al. |
| 7,709,296 B2 | 5/2010 | Campbell et al. |
| 2008/0044127 A1 | 2/2008 | Leising et al. |
| 2009/0267540 A1 * | 10/2009 | Chemel ................. F21V 29/763 315/297 |
| 2009/0310905 A1 | 12/2009 | Riester et al. |

* cited by examiner

*Primary Examiner* — Michelle R Connelly
*Assistant Examiner* — Hoang Tran
(74) *Attorney, Agent, or Firm* — Scully Scott Murphy and Presser

(57) ABSTRACT

A computer program product or hardware description language ("HDL") design structure in a computer-aided design system for generating a functional design model of an integrated circuitry structure including generating a functional representation of at least first and second regions of the integrated circuitry structure, generating a functional representation of an optical layer comprising optical waveguides, and generating a functional representation of a heat-conductive material for transferring heat from at least the second region through the optical layer to a heat sink.

21 Claims, 6 Drawing Sheets

TRANSFERRING HEAT THROUGH AN OPTICAL LAYER OF INTEGRATED CIRCUITRY

This application is a continuation of application Ser. No. 14/093,248 filed Nov. 29, 2013 entitled "TRANSFERRING HEAT THROUGH AN OPTICAL LAYER OF INTEGRATED CIRCUITRY", the disclosure of which is incorporated in its entirety herein by reference, which is a continuation of application Ser. No. 13/010,184 filed Jan. 20, 2011 entitled "TRANSFERRING HEAT THROUGH AN OPTICAL LAYER OF INTEGRATED CIRCUITRY", the disclosure of which is also incorporated in its entirety herein by reference.

BACKGROUND

The disclosures herein relate in general to integrated circuitry, and in particular to transferring heat through an optical layer of integrated circuitry.

Optical layers are relatively effective as thermal isolators. Accordingly, heat transfer is relatively difficult through an optical layer of integrated circuitry. Insufficient heat transfer can result in overheating, lower performance, and possible failure of the integrated circuitry.

BRIEF SUMMARY

A computer program product or hardware description language ("HDL") design structure in a computer-aided design system for generating a functional design model of an integrated circuitry structure including generating a functional representation of at least first and second regions of the integrated circuitry structure, generating a functional representation of an optical layer comprising optical waveguides, and generating a functional representation of a heat-conductive material for transferring heat from at least the second region through the optical layer to a heat sink.

DETAILED DESCRIPTION

Figure 1:
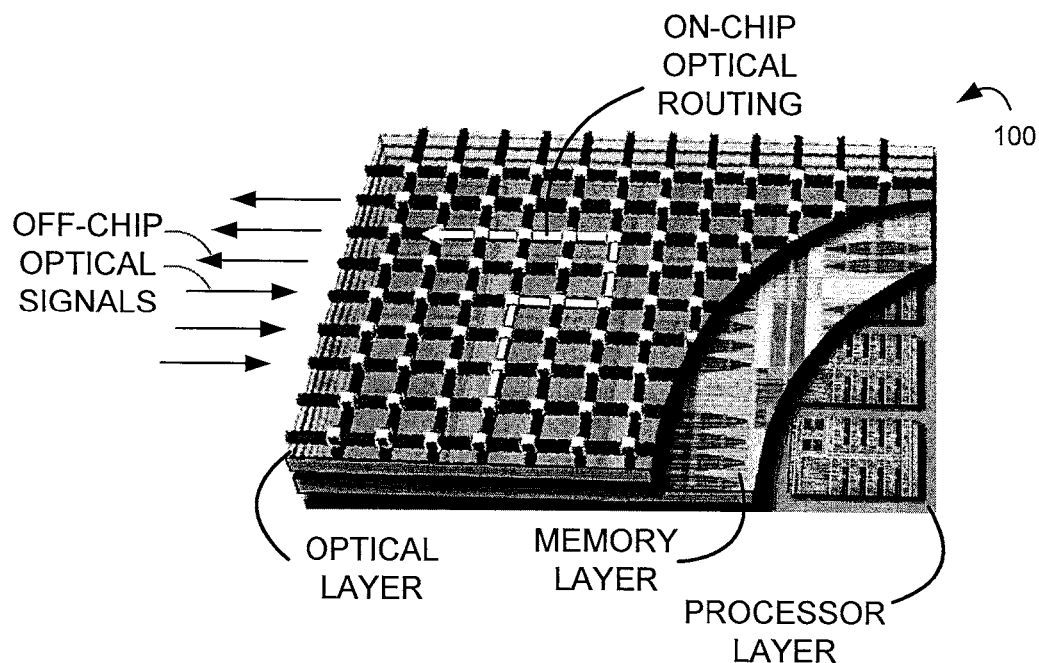
FIG. 1 is a top perspective sectional view of a first example integrated circuitry structure, according to the illustrative embodiment.

FIG. 1 is a top perspective sectional view of a first example integrated circuitry structure, indicated generally at 100, according to the illustrative embodiment. As shown in FIG. 1, the structure 100 includes various integrated circuitry components, such as: (a) microprocessor cores in a processor layer; and (b) memory devices in a memory layer. Also, FIG. 1 shows an optical layer for interconnecting such components. Through the optical layer, such components are operable to communicate information with one another (e.g., internal to the structure 100) and with other integrated circuitry structures (e.g., external to the structure 100). For illustration, FIG. 1 shows: (a) an example path of on-chip optical routing of information, which is communicated (through the optical layer) between such components (e.g., internal to the structure 100); and (b) example paths of off-chip optical signals, which are communicated (through the optical layer) between the structure 100 and other integrated circuitry structures (e.g., external to the structure 100).

The structure 100 receives electrical power from an external source (e.g., through a power connection below the processor layer). Beneath the optical layer, the structure 100 includes copper, which is shown in FIGS. 3, 4, 5 and 6 (instead of FIG. 1) for clarity. In one embodiment, the copper is a continuous layer. In an alternative embodiment, the copper is a patterned layer.

Figure 5:
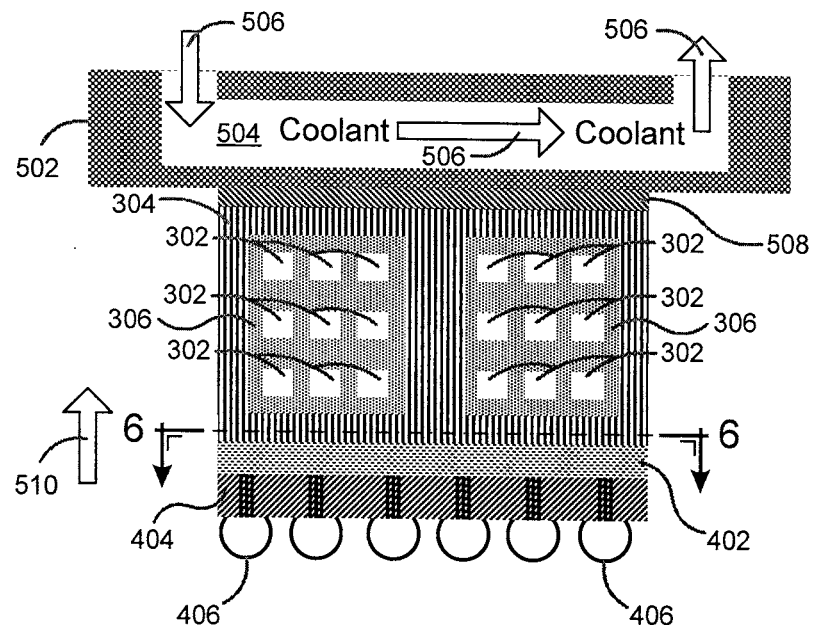
FIG. 5 is a sectional view of a second portion of the section of FIG. 3, taken along a line 5-5 of FIG. 3.

Such copper is a heat-conductive material, and it transfers heat (from below the optical layer) up through the optical layer to a heat sink (above the optical layer), which is shown in FIG. 5 (instead of FIG. 1) for clarity. Accordingly, the structure 100 reduces the optical layer's thermal isolation, so that heat transfer is achieved through the optical layer of the structure 100. Such heat transfer is especially helpful if the structure 100 has relatively high amounts of power consumption, thermal activity and heat generation.

Figure 2:
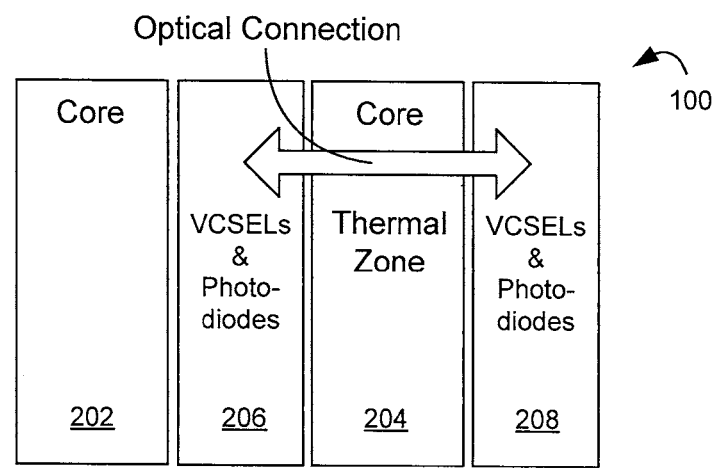
FIG. 2 is a block diagram of cores and photonic devices of the structure of FIG. 1.

FIG. 2 is a block diagram of cores (e.g., microprocessor cores) and photonic devices of the structure 100. The cores include a core 202 and a core 204, so that the structure 100 includes multi-core die integrated circuitry. The photonic devices include: (a) a first set 206 of optical transmitters and receivers, such as vertical cavity surface emitting lasers ("VCSELs") and photodiodes, for communicating information to and from their associated core 202; and (b) a second set 208 of optical transmitters and receivers for communicating information to and from their associated core 204. Also, the photonic devices may include optical multiplexers and modulators. As shown in the example of FIG. 2, through an optical connection: (a) the core 202 outputs information (via optical transmitters of the first set 206), which is received by the core 204 (via optical receivers of the second set 208); and (b) the core 204 outputs information (via optical transmitters of the second set 208), which is received by the core 202 (via optical receivers of the first set 206). Such optical connection is layered over the core 204, which is a thermal zone (e.g., a region that has relatively high amounts of power consumption, thermal activity and heat generation).

Figure 3:
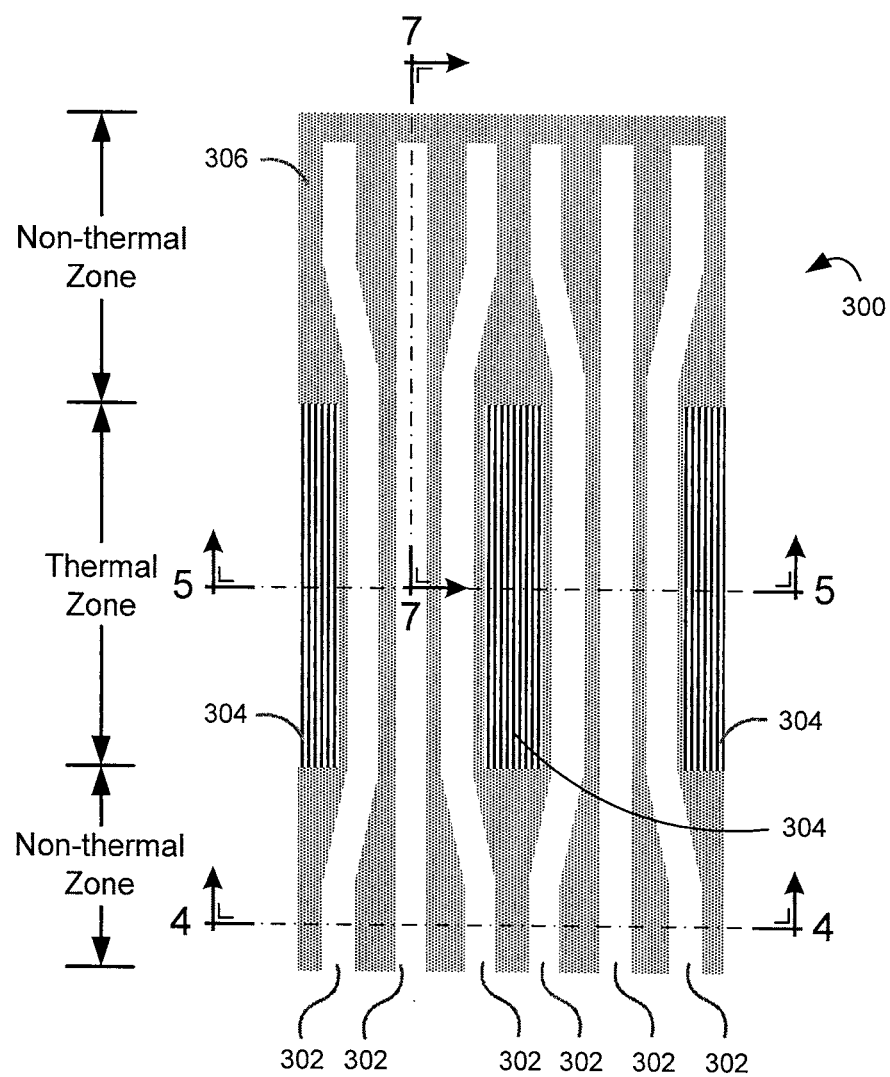
FIG. 3 is a plan view of a section of a second example integrated circuitry structure, according to the illustrative embodiment.

FIG. 3 is a plan view of the optical layer of a section of a second example integrated circuitry structure, indicated generally at 300, according to the illustrative embodiment. As shown in FIG. 3, optical waveguides 302 are spaced closer together (e.g., compacted or bundled) at the thermal zone of the structure 300 for increasing amounts of copper lamellas (e.g., copper pins) 304 that fit through the optical layer at the thermal zone. In the example of FIG. 3, the copper lamellas 304 are solid, instead of being laminated or layered. Accordingly, by spacing the waveguides 302 closer together (e.g., significantly closer together, or substantially closer together) at the thermal zone, the optical layer is enabled to have sufficient area remaining for larger copper lamellas 304 to fit through the optical layer at the thermal zone, without removing or otherwise re-routing the waveguides 302. The copper lamellas 304 transfer heat (from below the optical layer) up through the optical layer to a heat sink (above the optical layer) of FIG. 5, so that such heat is thereby transferred away from the thermal zone (and, likewise, away from the structure 300).

By comparison, the waveguides 302 are spaced farther apart from one another at non-thermal zones (e.g., regions that have relatively low amounts of power consumption, thermal activity and heat generation, such as optical connections that are layered over memory devices) to accommodate constraints (e.g., array pitch) of the photonic devices. Accordingly, by spacing the waveguides 302 farther apart (e.g., significantly farther apart, or substantially farther apart) from one another at non-thermal zones, the waveguides 302 are enabled to more easily connect with respective photonic devices at such non-thermal zones. In one example: (a) as a consequence of VCSEL diameters, neighboring VCSELs are spaced apart from one another by approximately 50 microns at such non-thermal zones; and (b) such VCSELs are connected to respective ones of the waveguides 302, which are likewise spaced apart from one another by approximately 50 microns at such non-thermal zones, but which are spaced apart from one another by significantly less than 50 microns at the thermal zone(s). In another example, as shown in FIG. 1, spacing of the waveguides 302 at thermal zones is the same as spacing of the waveguides 302 at non-thermal zones.

Paths of the waveguides 302 are formed by cladding 306, as shown in FIG. 3. The waveguides 302 include a light-transparent core material (e.g., glass, polymer, or fiber optic cable) that is suitable for conducting light signals. Such light-transparent core material has a first refractive index. By comparison, the cladding 306 includes a light-transparent material (e.g., a polymer material, such as siloxane or acrylate) that has a second refractive index lower (e.g., significantly lower, or substantially lower) than the first refractive index, so that the cladding 306 is suitable for guiding light in the waveguides 302 by internal reflection. Accordingly, by laminating, spray coating or spin coating various layers of the cladding 306 material, and by selectively etching them with photolithography or laser ablation (e.g., using a programmable laser), paths of the waveguides 302 are formed, and paths of the copper lamellas 304 are formed. In one embodiment, the copper lamellas 304 are deposited (e.g., by electroplating).

Figure 4:
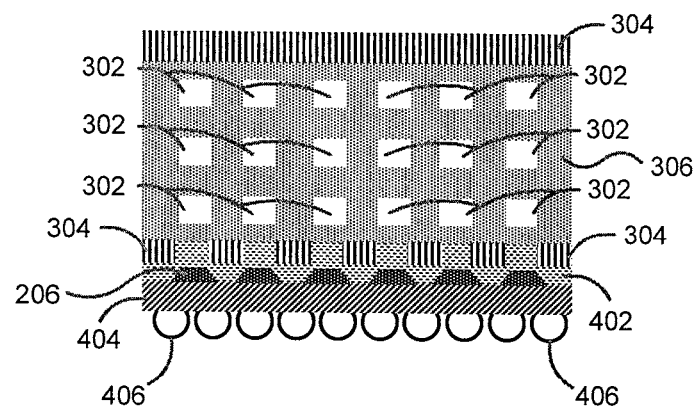
FIG. 4 is a sectional view of a first portion of the section of FIG. 3, taken along a line 4-4 of FIG. 3.

FIG. 4 is a sectional view of a first portion of the section of FIG. 3, taken along the line 4-4 of FIG. 3, at a non-thermal zone of the structure 300. Various integrated circuitry components of the structure 300 are coupled to one another through an array of the photonic devices 206 and 208, which are suitably connected via a three-dimensional routing of the waveguides 302. In FIG. 4, six of the photonic devices 206 are shown by identical trapezoidal shapes. Also, FIG. 4 shows a layer of suitable light-transparent material 402 (e.g., a polymer material, or other filler material), a layer of integrated circuitry 404 (e.g., including silicon dioxide insulator and semiconductor material), and ten of the solder balls 406 (which are shown by identical circular shapes). The photonic devices 206 and 208 are located within a top layer of a 3D stacked package. Through the solder balls 406, the structure is connectable to another integrated circuitry structure (e.g., at a lower layer of the 3D stacked package).

FIG. 5 is a sectional view of a second portion of the section of FIG. 3, taken along the line 5-5 of FIG. 3, at a thermal zone of the structure. FIG. 5 shows a heat sink 502, which conducts a flow of coolant (e.g., water or air) through a channel 504 in a direction of arrows 506. The copper lamellas 304 transfer heat (from below the optical layer) up through the optical layer to the heat sink 502, so that such heat is thereby transferred away from the thermal zone (and, likewise, away from the structure) by such flow of coolant through the channel 504. Accordingly, the heat sink 502 is coupled to the copper lamellas 304 through a layer 508 of a thermal material (e.g. thermal grease, thermal adhesive, or thermal gel) that is suitable for enabling such transfer of heat in a direction of an arrow 510.

Figure 6:
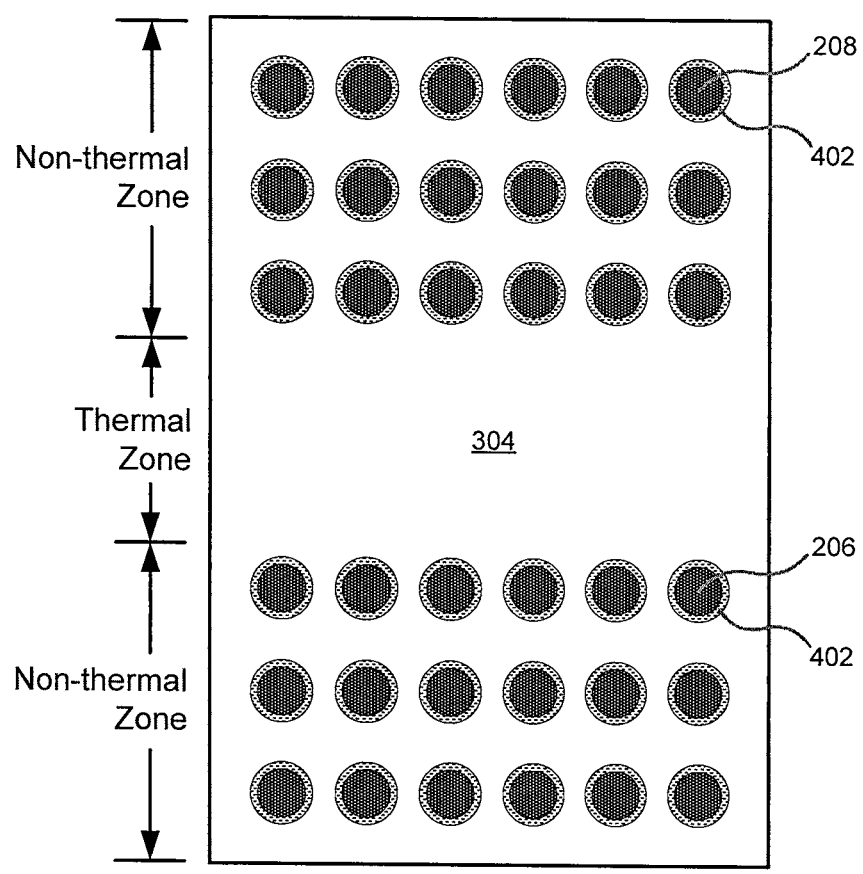
FIG. 6 is a sectional view of a third portion of the section of FIG. 3, taken along a line 6-6 of FIG. 5.

FIG. 6 is a sectional view of a third portion of the section of FIG. 3, taken along the line 6-6 of FIG. 5. For clarity, FIG. 6 shows a perforated layer of the copper lamellas 304 without shading. In the lower half of FIG. 6, eighteen of the photonic devices 206 are shown by identical circular shapes, which extend through holes in the perforated layer of the copper lamellas 304. Similarly, in the upper half of FIG. 6, eighteen of the photonic devices 208 are shown by identical circular shapes, which extend through holes in the perforated layer of the copper lamellas 304. As shown in the sectional view of FIG. 6, each of the photonic devices 206 and 208 is embedded in the material 402.

Figure 7:
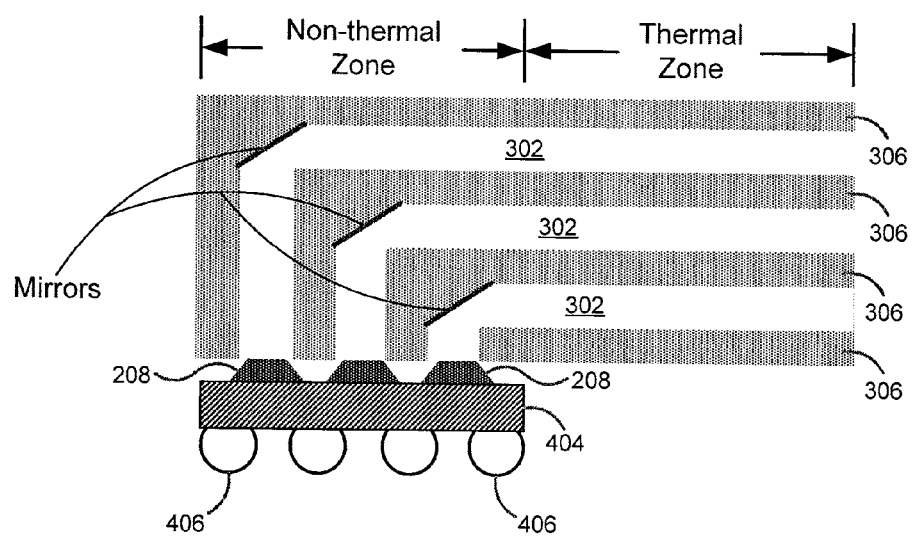
FIG. 7 is a sectional view of a fourth portion of the section of FIG. 3, taken along a line 7-7 of FIG. 3.

FIG. 7 is a sectional view of a fourth portion of the section of FIG. 3, taken along the line 7-7 of FIG. 3. In FIG. 7, three of the photonic devices 208 are shown by identical trapezoidal shapes, at a non-thermal zone of the structure 300. Also, FIG. 7 shows four of the solder balls 406 (which are shown by identical circular shapes). Moreover, FIG. 7 shows how the waveguides 302 include respective mirrors for redirecting optical signals to and from the photonic devices 208. For clarity, the material 402 is not shown in FIG. 7. The photonic devices 208 are suitably coupled to the waveguides 302 (e.g., butt-coupled, or coupled through a grating).

Figure 8:
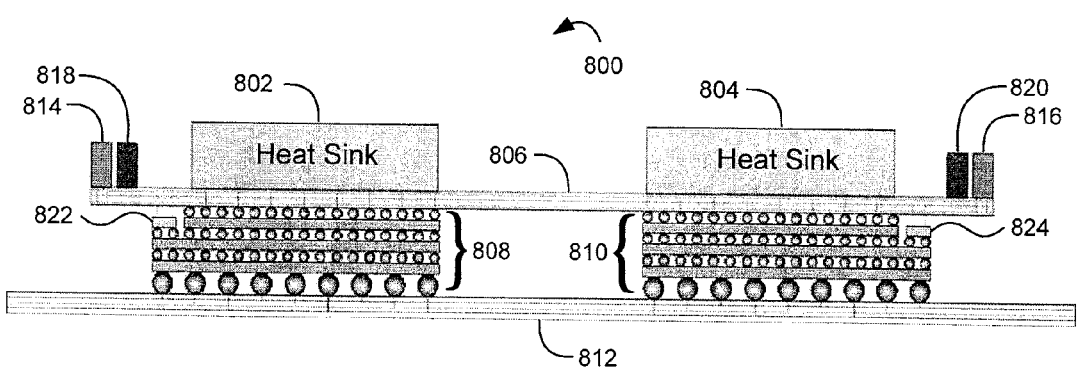
FIG. 8 is an elevational view of a third example integrated circuitry structure, according to the illustrative embodiment.

FIG. 8 is an elevational view of a third example integrated circuitry structure, indicated generally at 800, according to the illustrative embodiment. As shown in FIG. 8, heat sinks 802 and 804 are disposed over an optical plane 806. The optical plane 806 is disposed over 3D stacked packages 808 and 810, which are disposed over an electrical signal plane 812.

The optical plane 806 is an optical layer that has an integrated optical link (and, optionally, has additional integrated circuitry for conducting electrical power and signals). Accordingly, FIG. 8 shows electrical connectors 814 and 816, and optical connectors 818 and 820. The 3D stacked packages 808 and 810 include optical transceiver modules 822 and 824, respectively.

In the example of FIG. 8, the core 202 (FIG. 2) is located within a first integrated circuit of the 3D stacked package 808, and the core 204 (FIG. 2) is located within a second integrated circuit of the 3D stacked package 810. Accordingly: (a) a first thermal zone of the structure 800 is located at a first region of the optical plane 806 interposed between the heat sink 802 and the 3D stacked package 808; and (b) a second thermal zone of the structure 800 is located at a second region of the optical plane 806 interposed between the heat sink 804 and the 3D stacked package 810. A non-thermal zone of the structure 800 is located at a third region of the optical plane 806, where it is not interposed between a heat sink and a 3D stacked package (e.g., such non-thermal zone is a region of the optical plane 806 centered between the heat sinks 802 and 804).

In the same manner as FIG. 3, copper lamellas transfer heat (from the 3D stacked packages 808 and 810, and from the electrical signal plane 812) through the optical plane 806 to the heat sinks 802 and 804, so that such heat is thereby transferred away from such thermal zones (and, likewise, away from the structure 800). Optical waveguides of the optical plane 806 are spaced closer together at such thermal zones of the structure 800 for increasing amounts of such copper lamellas that fit through the optical plane 806 at such thermal zones. By comparison, such waveguides are spaced farther apart from one another at non-thermal zones of the structure 800 to accommodate constraints of its various photonic devices. In one embodiment, such waveguides optically couple (e.g., optically connect) the core 202 (within the first integrated circuit of the 3D stacked package 808) to the core 204 (within the second integrated circuit of the 3D stacked package 810), and vice versa.

Figure 9:
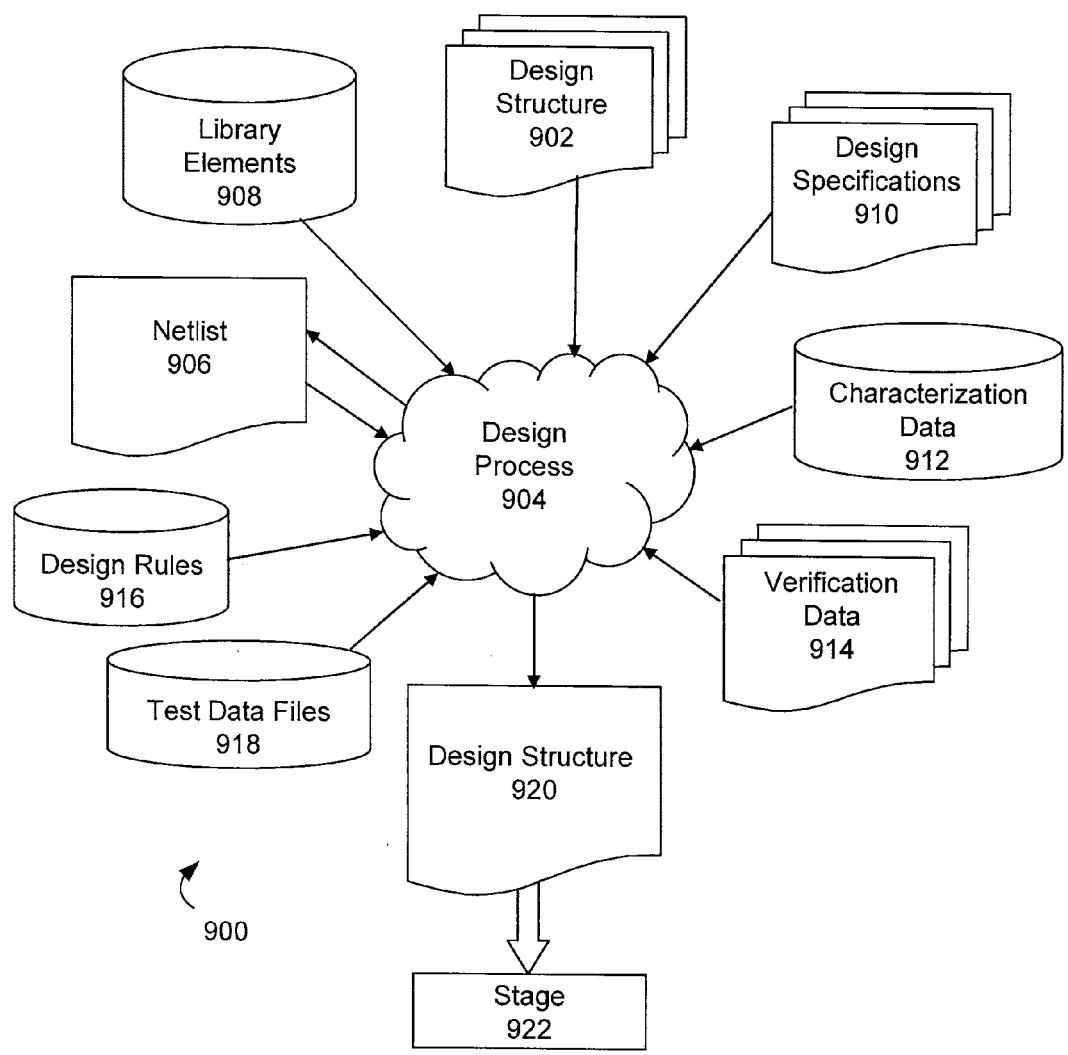
FIG. 9 is a flow diagram of a design process for semiconductor design, manufacture, and/or test.

FIG. 9 shows a block diagram of an illustrative design flow, indicated generally at 900. For example, the design flow 900 is suitable for semiconductor integrated circuit ("IC") logic design, simulation, test, layout, and manufacture. The design flow 900 includes processes, machines and/or mechanisms for processing design structures or devices to generate logically or otherwise functionally equivalent representations of the design structures and/or devices described above and shown in FIGS. 1 through 8. The design structures processed and/or generated by the design flow 900 are encodable on machine-readable transmission or data storage media to include data and/or instructions that, when executed or otherwise processed by a data processing system, generate a logically, structurally, mechanically or otherwise functionally equivalent representation of hardware components, circuits, devices or systems. Such machines include, but are not limited to, any machine for an IC design process, such as designing, manufacturing or simulating a circuit, component, device or system. Example machines include: lithography machines, machines and/or equipment for generating masks (e.g., e-beam writers), computers or equipment for simulating design structures, apparatus for manufacturing or test, and machines for programming functionally equivalent representations of the design structures into any medium (e.g., a machine for programming a programmable gate array).

The design flow 900 is variable according to a type of representation being designed. For example, a design flow 900 for building an application specific IC ("ASIC") is potentially different from a design flow 900 for designing a standard component or from a design flow 900 for instantiating the design into a programmable array, such as a programmable gate array ("PGA") or a field programmable gate array ("FPGA") offered by Altera® Inc. or Xilinx® Inc.

FIG. 9 illustrates multiple such design structures, including an input design structure 902 that is preferably processed by a design process 904. In one example, the design structure 902 is a logical simulation design structure generated and processed by the design process 904 to produce a logically equivalent functional representation of a hardware device. In another example, the design structure 902 includes data and/or program instructions that, when processed by the design process 904, generate a functional representation of the physical structure of a hardware device. Irrespective of whether it represents functional and/or structural design features, the design structure 902 is suitable for generation by electronic computer-aided design ("ECAD"), such as implemented by a core developer/designer. When encoded on a machine-readable data transmission, gate array or storage medium, the design structure 902 is accessible and processable by one or more hardware and/or software modules within the design process 904 to simulate or otherwise functionally represent an electronic component, circuit, electronic or logic module, apparatus, device or system, such as those shown in FIGS. 1 through 8. Accordingly, the design structure 902 includes files or other data structures (e.g., containing human and/or machine-readable source code, compiled structures and computer-executable code structures) that, when processed by a design or simulation data processing system, functionally simulate or otherwise represent circuits or other levels of hardware logic design. In one example, such data structures include hardware-description language ("HDL") design entities or other data structures conforming to and/or compatible with lower level HDL design languages (e.g., Verilog and VHDL) and/or higher level design languages (e.g., C or C++).

The design process 904 preferably employs and incorporates hardware and/or software modules for generating a netlist 906 by synthesizing, translating or otherwise processing a design/simulation functional equivalent of the components, circuits, devices or logic structures shown in FIGS. 1 through 8. The netlist 906 is suitable for containing design structures, such as the design structure 902. In one example, the netlist 906 includes compiled or otherwise processed data structures (e.g., representing a list of wires, discrete components, logic gates, control circuits, I/O devices, and models) for describing connections to other elements and circuits in an integrated circuit design. The netlist 906 is synthesizable by an iterative process, in which the netlist 906 is resynthesized one or more times, according to design specifications and parameters for the device. As with other design structure types described herein, the netlist 906 is recordable on a machine-readable data storage medium or programmable into a programmable gate array. In one example, the medium is a non-volatile storage medium, such as a magnetic or optical disk drive, a programmable gate array, a compact flash, or other flash memory. In another example, the medium is a system or cache memory, buffer space, or electrically or optically conductive devices and materials, on which data packets are suitable for transmission and intermediate storage via the Internet and/or other networks.

The design process 904 includes hardware and/or software modules for processing a variety of input data structure types, such as the netlist 906. In one example, such data structure types reside within library elements 908 and include a set of elements, circuits and devices (e.g., models, layouts and symbolic representations) for particular manufacturing technologies (e.g., different technology nodes, 32 nm, 45 nm, and 90 nm). The data structure types also include design specifications 910, characterization data 912, verification data 914, design rules 916, and test data files 918, such as input test patterns, output test results, and other testing information. In other examples, the design process 904 further includes various mechanical design processes, such as stress analysis, thermal analysis, mechanical event simulation, and process simulation for various operations (e.g., casting, molding, and die press forming). One of ordinary skill in the art of mechanical design can appreciate the extent of possible mechanical design tools and applications for the design process 904. In yet another example, the design process 904 includes modules for performing various circuit design processes (e.g., timing analysis, verification, design rule checking, and place and route operations).

The design process 904 employs and incorporates logic and physical design tools (e.g., HDL compilers and simulation model build tools) for generating a second design structure 920, in response to processing the design structure 902 together with some or all of the depicted supporting data structures and mechanical design or data (to an extent applicable). The design structure 920 resides on a storage medium or programmable gate array in a data format that is suitable for exchanging data of mechanical devices and structures (e.g., information stored in an IGES, DXF, Parasolid XT, JT, DRG, or other suitable format for storing or rendering such mechanical design structures). Similar to the design structure 902, the design structure 920 preferably includes one or more files, data structures, or other computer-encoded data and/or instructions that reside on machine-readable transmission or data storage media and that, when processed by an ECAD system, generate a logically, structurally, mechanically or otherwise functionally equivalent form of one or more of the embodiments shown in FIGS. 1 through 8. In one embodiment, the design structure 920 includes a compiled, executable HDL simulation model that functionally simulates the devices shown in FIGS. 1 through 8.

The design structure 920 employs a data format that is suitable for exchanging layout data of integrated circuits and/or symbolic data format (e.g., information stored in a GDSII (GDS2), GL1, OASIS, map files, or other suitable format for storing such design data structures). For example, the design structure 920 includes various types of information (e.g., symbolic data, map files, test data files, design content files, manufacturing data, layout parameters, wires, levels of metal, vias, shapes, data for routing through the manufacturing line, and other data) for a manufacturer or other designer/developer to produce a device or structure as described above and shown in FIGS. 1 through 8. At a stage 922, the design structure 920: proceeds to tape-out; is released to manufacturing; is released to a mask house; is sent to another design house; is sent back to the customer; and/or is processed by other types of operations.

The terminology used herein is for the purpose of describing particular embodiments only and is not intended to be limiting of the inventions. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It is also understood that the drawings and their various components shown and discussed above are not necessarily drawn to scale.

The corresponding structures, materials, acts, and equivalents of all means or step plus function elements in the claims below are intended to include any structure, material, or act for performing the function in combination with other claimed elements as specifically claimed. The description herein has been presented for purposes of illustration and description, but is not intended to be exhaustive or limited to the inventions in the form disclosed. Many modifications and variations will be apparent to those of ordinary skill in the art without departing from the scope and spirit of the inventions. The embodiment was chosen and described in order to best explain the principles of the inventions and the practical application, and to enable others of ordinary skill in the art to understand the inventions for various embodiments with various modifications as are suited to the particular use contemplated.

What is claimed is:

1. A hardware description language ("HDL") design structure encoded on a non-transitory machine-readable data storage medium, the HDL design structure comprising elements that, when processed in a computer-aided design system, generate a machine-executable representation of an integrated circuitry structure for designing, manufacturing, or testing an integrated circuit, wherein the HDL design structure comprises:
   an optical layer comprising optical waveguides within a first material having a first thermal conductivity, the optical waveguides bundled into a plurality of sets of closely spaced optical waveguides situated substantially throughout a thermal zone within the integrated circuit structure having high thermal activity, and each optical waveguide further individually spaced further apart substantially throughout a non-thermal zone within the integrated circuit structure having low thermal activity; and
   a heat-conductive material, having a second thermal conductivity greater than the first thermal conductivity, disposed between the sets of bundled optical waveguides in the first material of the thermal zone, for transferring heat from at least the thermal zone through the optical layer to a heat sink located above the optical layer.

2. The design structure of claim 1, wherein the optical waveguides are spaced farther apart from one another substantially throughout the non-thermal zone, for enabling the optical waveguides to connect with respective photonic devices at the non-thermal zone; and wherein the optical waveguides are spaced closer together in the sets of bundled optical waveguides substantially throughout the thermal zone, for increasing an amount of the heat conductive material that fits through the optical layer at the thermal zone.

3. The design structure of claim 2, wherein the optical waveguides are spaced apart from one another by a first distance substantially throughout the non-thermal zone and by a second distance substantially throughout the thermal zone, and wherein the second distance is significantly less than the first distance.

4. The design structure of claim 2, wherein the photonic devices comprise an optical transmitter.

5. The design structure of claim 2, wherein the photonic devices comprise an optical receiver.

6. The design structure of claim 1, wherein the non-thermal zone is for generating a first amount of heat, and wherein the thermal zone is for generating a second amount of heat that is greater than the first amount.

7. The design structure of claim 1, wherein the non-thermal zone comprises a first integrated circuit, wherein the thermal zone comprises a second integrated circuit, and wherein the optical waveguides are for optically coupling the first and second integrated circuits.

8. The design structure of claim 1, wherein the optical waveguides comprise a light-transparent core material.

9. The design structure of claim 1, wherein the design structure comprises a netlist.

10. The design structure of claim 1, wherein the design structure resides on a storage medium as a data format for exchange of layout data of the integrated circuitry structure.

11. The design structure of claim 1, wherein the design structure elements, when processed in a computer-aided design system, generate a representation of an integrated circuit in a format perceptible by humans.

12. A computer program product for generating a functional design model of an integrated circuitry structure, the computer program product comprising a non-transitory computer readable storage medium having program instructions embodied therewith, the program instructions executable by a processing circuit to cause the circuit to perform a method comprising:
   generating a functional representation of a thermal zone and a non-thermal zone of the integrated circuitry structure, the thermal zone having high thermal activity needing greater heat transfer than the non-thermal zone having low thermal activity;
   generating a functional representation of an optical layer comprising optical waveguides within a first material having a first thermal conductivity, the optical waveguides bundled into a plurality of sets of closely spaced optical waveguides substantially throughout the thermal zone and individually spaced further apart substantially throughout the non-thermal zone; and generating a functional representation of a heat-conductive material, having a second thermal conductivity greater than the first thermal conductivity, disposed between the sets of bundled optical waveguides in the first material of the thermal zone, for transferring heat from at least the thermal zone through the optical layer to a heat sink located above the optical layer.

13. The computer program product of claim 12, wherein the optical waveguides are spaced farther apart from one another substantially throughout the non-thermal zone, for enabling the optical waveguides to connect with respective photonic devices at the non-thermal zone; and wherein the optical waveguides are spaced closer together in the sets of bundled optical waveguides substantially throughout the thermal zone, for increasing an amount of the heat conductive material that fits through the optical layer at the thermal zone.

14. The computer program product of claim 13, wherein the optical waveguides are spaced apart from one another by a first distance substantially throughout the non-thermal zone and by a second distance substantially throughout the thermal zone, and wherein the second distance is significantly less than the first distance.

15. The computer program product of claim 14 wherein the non-thermal zone is for generating a first amount of heat, and wherein the thermal zone is for generating a second amount of heat that is greater than the first amount; wherein the non-thermal zone comprises a first integrated circuit, wherein the thermal zone comprises a second integrated circuit, and wherein the optical waveguides are for optically coupling the first and second integrated circuits; wherein the optical waveguides comprise a light transparent core material; and wherein the light-transparent core material has a first refractive index, and wherein the optical waveguides are formed by laminating and selectively etching layers of a cladding material having a second refractive index lower than the first refractive index.

16. The computer program product of claim 13, wherein the photonic devices comprise an optical transmitter.

17. The computer program product of claim 13, wherein the photonic devices comprise an optical receiver.

18. The computer program product of claim 12, wherein the non-thermal zone is for generating a first amount of heat, and wherein the second region is for generating a second amount of heat that is greater than the first amount.

19. The computer program product of claim 12, wherein the non-thermal zone comprises a first integrated circuit, wherein the thermal zone comprises a second integrated circuit, and wherein the optical waveguides are for optically coupling the first and second integrated circuits.

20. The computer program product of claim 12, wherein the optical waveguides comprise a light transparent core material.

21. The computer program product of claim 20, wherein the light-transparent core material has a first refractive index, and wherein the optical waveguides are formed by laminating and selectively etching layers of a cladding material having a second refractive index lower than the first refractive index.

* * * * *